(12) United States Patent
Swatek et al.

(10) Patent No.: US 10,243,508 B2
(45) Date of Patent: Mar. 26, 2019

(54) SOLAR MODULE

(71) Applicant: SFS Acquisition, LLC, Boston, MA (US)

(72) Inventors: Alexander Swatek, Gussing (AT); Elmar Stoger, Bad Erlach (AT); Alfred Kaser, Seligenstadt (DE); Manfred Prasent, Althofen (AT)

(73) Assignee: SFS Acquisition, LLC, Boston, MA (US)

( * ) Notice: Subject to any disclaimer, the term of this patent is extended or adjusted under 35 U.S.C. 154(b) by 296 days.

(21) Appl. No.: 14/760,833

(22) PCT Filed: Jan. 20, 2014

(86) PCT No.: PCT/AT2014/050019
§ 371 (c)(1),
(2) Date: Jul. 14, 2015

(87) PCT Pub. No.: WO2014/113830
PCT Pub. Date: Jul. 31, 2014

(65) Prior Publication Data
US 2015/0365047 A1    Dec. 17, 2015

(30) Foreign Application Priority Data
Jan. 23, 2013 (AT) .................................. 50050/2013

(51) Int. Cl.
*H02S 30/20* (2014.01)
(52) U.S. Cl.
CPC .................................. *H02S 30/20* (2014.12)
(58) Field of Classification Search
CPC ........... H02S 30/00; H02S 30/10; H02S 30/20
See application file for complete search history.

(56) References Cited

U.S. PATENT DOCUMENTS

| | | | |
|---|---|---|---|
| 5,037,043 A * | 8/1991 | Roth ...................... | B64G 1/222 136/245 |
| 6,499,266 B1 * | 12/2002 | Macumber ............... | E04C 3/08 52/632 |

(Continued)

FOREIGN PATENT DOCUMENTS

| | | |
|---|---|---|
| AT | 509886 A4 | 12/2011 |
| CN | 201387891 Y | 1/2010 |

(Continued)

OTHER PUBLICATIONS

International Preliminary Report on Patentability for International Application No. PCT/AT2014/050019 dated Jul. 23, 2015.

(Continued)

*Primary Examiner* — Bethany L Martin
(74) *Attorney, Agent, or Firm* — Wolf, Greenfield & Sacks, P.C.

(57) ABSTRACT

Disclosed is a solar module, comprising a plurality of lamellar solar panels, which are mounted on a common axis so as to be able to pivot between a first position, in which they are positioned one on top of the other in a substantially coincident manner, and a second position, in which they are fanned out substantially adjacently, wherein, of every two adjacent solar panels, only the axis-side end section of the one solar panel has at least one guide and only the axis-side end section of the other solar panel has two stops which interact with the guide and are spaced from each other in the tangential direction, and wherein the solar panels are spaced from each other in the fanned out second position in their radially projecting sections that adjoin the aforementioned end sections.

20 Claims, 8 Drawing Sheets

(56) References Cited

U.S. PATENT DOCUMENTS

| 8,664,511 | B2 | | 3/2014 | Swatek et al. |
| 2011/0315192 | A1 | * | 12/2011 | Swatek ................... H02S 30/20 136/245 |

FOREIGN PATENT DOCUMENTS

| FR | 2942351 | | 8/2010 |
| JP | 10304918 | A | 11/1998 |
| JP | H10 304928 | A | 11/1998 |
| KR | 20100000029 | U | 1/2010 |

OTHER PUBLICATIONS

International Preliminary Report on Patentability (IPRP) for International Application No. PCT/AT2014/050019 dated Jun. 5, 2015.
Austrian Office Action dated Nov. 26, 2013.

\* cited by examiner

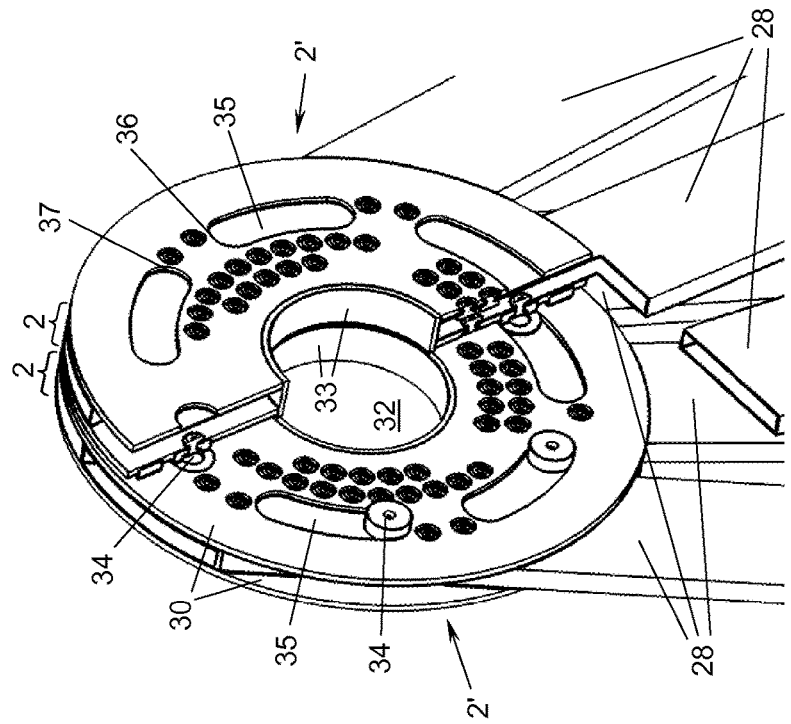
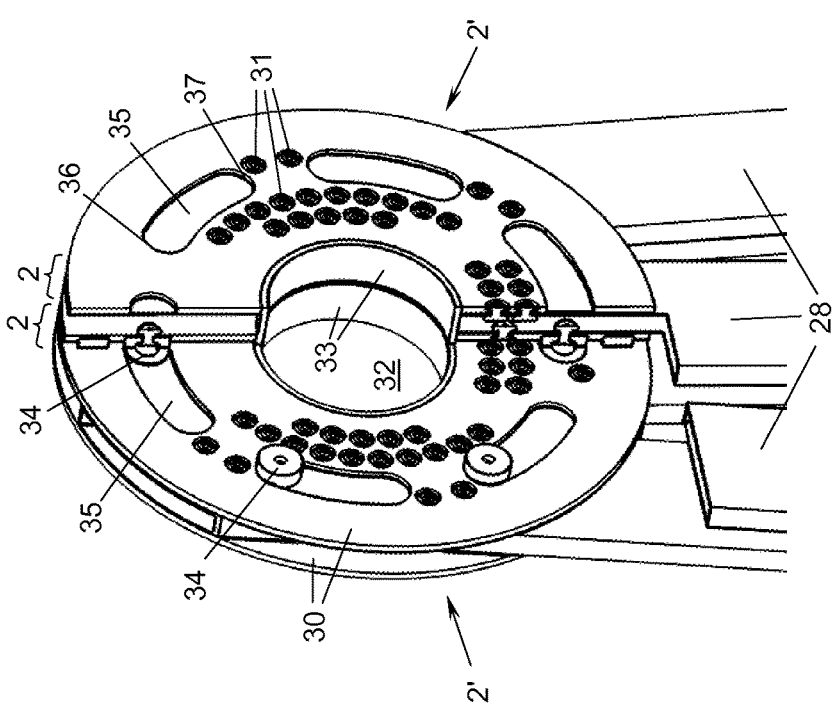
Fig. 4a
Fig. 4b

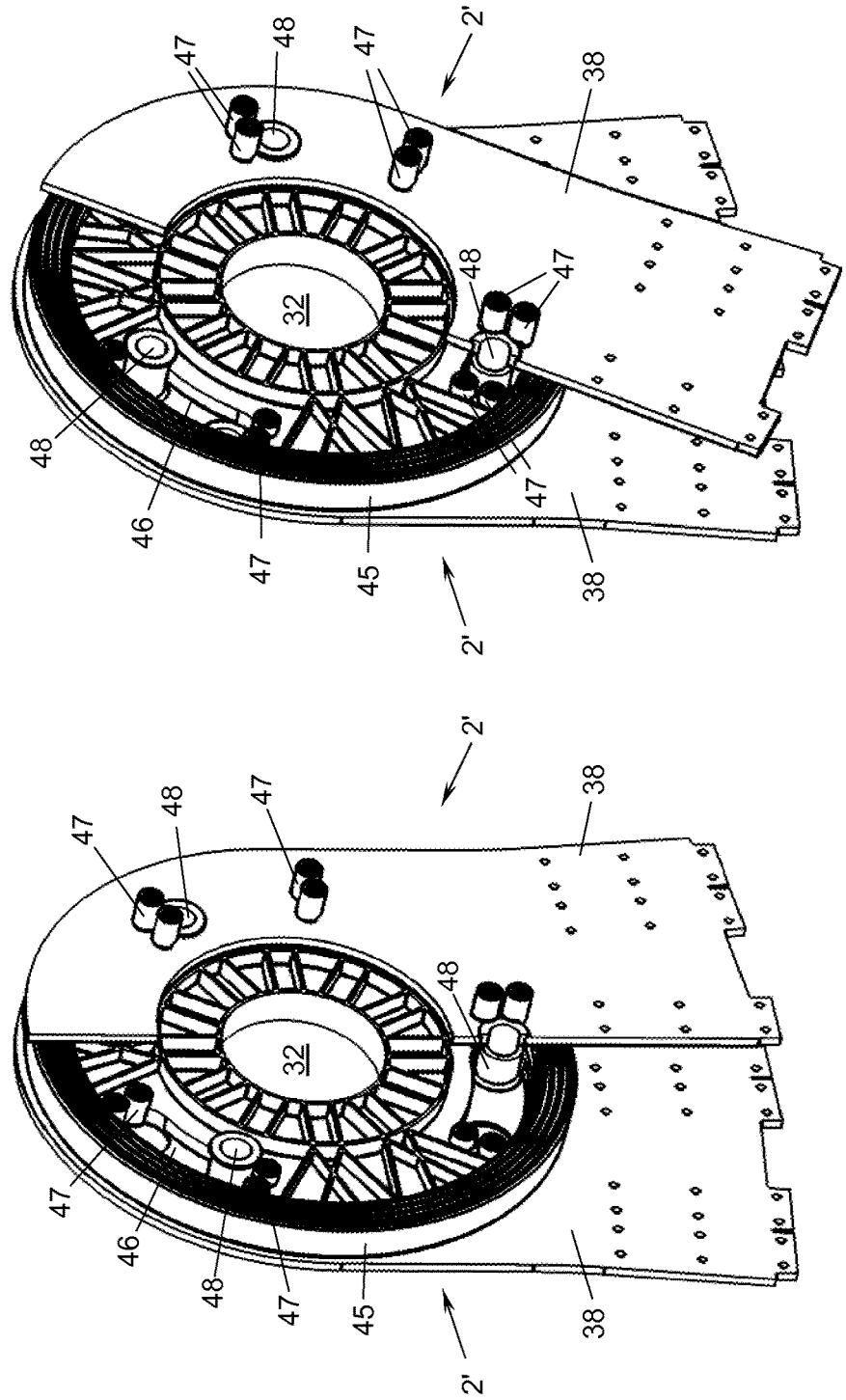

SOLAR MODULE

CROSS-REFERENCE TO RELATED APPLICATIONS

This application is a National Phase application of International Application No. PCT/AT2014/050019 filed Jan. 20, 2014 which claims priority to Austrian Patent Application No. A 50050/2013 filed Jan. 23, 2013, the disclosures of which are incorporated herein by reference.

FIELD OF THE INVENTION

The present invention relates to a solar module, comprising a plurality of lamellar solar panels, which are mounted on a common axis so as to be able to pivot between a first position, in which they are positioned one over the other in a substantially congruent manner, and a second position, in which they are fanned-out so as to substantially lie next to each other.

BACKGROUND

Such a solar module is known from document AT 509 886 B1 and has the advantage that the sensitive solar panels can be accommodated in a space-saving manner in the folded first position in a protective housing, in which they are protected from damages during the night or at bad weather, e.g., storm, lightning, hail, or strong rain, and can provide a maximum receiving surface for sunlight in the fanned-out second position.

For the fanning-out about said common axis, it is known from said document, e.g., to only drive the topmost or lowest solar panel of the stack of panels, wherein each solar panel drags the solar panel lying below it or above it via catches. With the known construction, dragging hooks or dragging strips are provided, which run across the whole length of the solar panel along its longitudinal edge.

SUMMARY

The invention sets its aim to provide an improved construction for fanning-out the solar module.

This aim is achieved with a solar module of the type mentioned in the introduction, which solar module is characterised according to the invention in that of each two neighbouring solar panels only the end section, which is located on the side of the axis, of one solar panel comprises at least one catch and only the end section, which is located on the side of the axis, of the other panel comprises two stops, which interact with the catch and have a mutual distance in a tangential direction, wherein the solar panels are mutually spaced from each other in the fanned-out second position at their radially protruding sections which adjoin said end sections.

The invention is based on the findings that dragging strips, which run across the whole length of the solar panels, lead to a disadvantageous entanglement of the solar panels in the fanned-out state, which impairs their flexibility and thereby increases their susceptibility to wind; the dragging strips can furthermore lead to damages of the solar panels caused by vibrations. Due to the inventive positioning of the catches and stops only on the end sections, which are located on the side of the axis, of the solar panels, the fanned-out solar panels remain unaffected from each other in their radially protruding sections, such that their vibrations can drop off unhinderedly there, which increases their wind safety and thereby lifespan.

By means of the construction according to the invention, the photovoltaically active outer sections of the solar panels can be constructed so that they are modularly replaceable from the end sections, which are located on the side of the axis and are used for the dragging construction. Thereby, e.g., all end sections, which are located on the side of the axis, can be uniformly construed in the type of a central "fanning-out mounting" for different types and sizes of solar panels.

Preferably, the end sections have an approximately disk-like shape and each two neighbouring end sections comprise, on their disk-sides mutually facing each other, at least two, preferably at least three, catches distributed in a tangential direction and therewith interacting stops. Thereby, the solar panels lie with their end sections against each other in a disk-like manner, whereby they are positioned axially on the common axis. The force transmission during fanning-out is thereby distributed symmetrically onto the disk sections via the circumferentially distributed catches and stops, such that these are not subject to jamming forces, which minimizes the friction between the end section.

Especially preferably, each two stops mutually distanced in a tangential direction are embodied by a tangential oblong hole in the end section, into which the catch of the neighbouring end section engages. This yields a catch/stop-construction with minimal axial space requirements because the catch of one end section plunges directly into the oblong hole of the neighbouring end section.

According to a first preferred embodiment of the invention, at least one end section is embodied by the ends of support struts of a solar panel, which are mounted in a sandwich-like manner between two mounting plates mounted on the axis, of which one comprises at least one tangential oblong hole and the other a catch. Thereby, a symmetrical, continuous force flow is stabilized from the support struts ("leaf veins") of a solar panel via the mounting plates symmetrically adjoining thereto onto the mounting axis. The support struts can also be led around the mounting axis from both sides, e.g., the mounting axis can also be positioned between the support struts. Each catch can preferably be embodied as a bolt riveted to one of the mounting plates, which allows an extremely easy fabrication.

According to a second preferred embodiment of the invention, at least one end section is embodied by a mounting plate mounted on the axis for supporting struts of a solar panel and by a spacer disk lying against said mounting plate in a rotation-fixed manner, wherein the spacer disk comprises at least one tangential oblong hole and the mounting plate comprises at least one protruding bolt as a catch. With this variation, the torque transmission from panel to panel is achieved via the spacer disks, which are each connected to one of the panels in a rotation fixed manner, which spacer disks, e.g., as injection moulded pieces, can be provided especially easy with tangential oblong holes. It is especially preferred if the bolt penetrates the mounting plate and rests in a recess of the spacer disk, such that one and the same element, namely the bolt, can be used on one side of the mounting plate as a catch and on the other side of the mounting plate as a rotation-fix for the spacer disk abutting there.

According to a third advantageous embodiment of the invention, there is, between at least two end sections, a spacer disk threaded onto the axis, which has tangential oblong holes for the passing-through of the interacting catches and stops of the end sections. The torque transmission from panel to panel here occurs directly between the catch of one panel and the stops of the other panel, such that the spacer disk is only used for keeping a distance and can thereby, e.g., as an injection-moulded piece, be embodied in an especially weight-saving and delicate manner. According to this, the spacer disk is preferably embodied as a multiply perforated sliding disk.

Generally, the solar module can comprise any arbitrary number of solar panels. According to a preferred embodiment, twelve solar panels are provided and each oblong hole extends tangentially over an angle of approximately 30°, which represents a good compromise between complexity on the one hand and compactness in the folded state on the other hand.

According to a further preferred feature of the invention, the axis is rotatably mounted on a support structure of the solar module, wherein the end section of the first solar panel, which is located near the support structure, is fixed on the support structure and the end section of the last solar panel, which is positioned away from the support structure, is connected to the axis in a rotation-fixed manner. Here it is especially advantageous if the end of the axis which is positioned away from the support structure is provided with a top plate, which is connected to the last end section in a rotation-fixed manner. Both measures simplify the driving of the solar panels during fanning-out and fanning-back-in, since the threading and mounting axis is simultaneously used as a drive shaft. The driving of the axis can thereby be performed in any type known in the art, for example, by directly flanging it to an electric motor with a low-transmission gear.

Preferably, the axis is driven via a worm gear by an electric motor. Worm gears have a very low transmission and are self-locking, whereby an automatic blocking of the solar panels in the fanned-out and fanned-in positions is achieved.

Preferably, for reducing friction, the end sections are mounted via a common sliding sleeve on the axis, which simplifies mounting. Furthermore, sliding disks can be arranged between the end sections if said spacer disks or mounting plates, respectively, are not themselves made out of friction-reducing material or provided with a slide coating.

BRIEF DESCRIPTION OF THE DRAWINGS

The invention shall now be explained in more detail on the basis of exemplary embodiments, which are depicted in the accompanying drawings, in which:

FIGS. 4a and 4b each show the end sections of two solar panels of the embodiments of FIG. 3, of which one is partially broken up, in perspective views in two different operating positions;

FIGS. 8a and 8b each show the end sections of two solar panels of the embodiment of FIG. 7, of which one is partially broken up, in perspective views in two different operating positions.

DETAILED DESCRIPTION

Figure 1A:
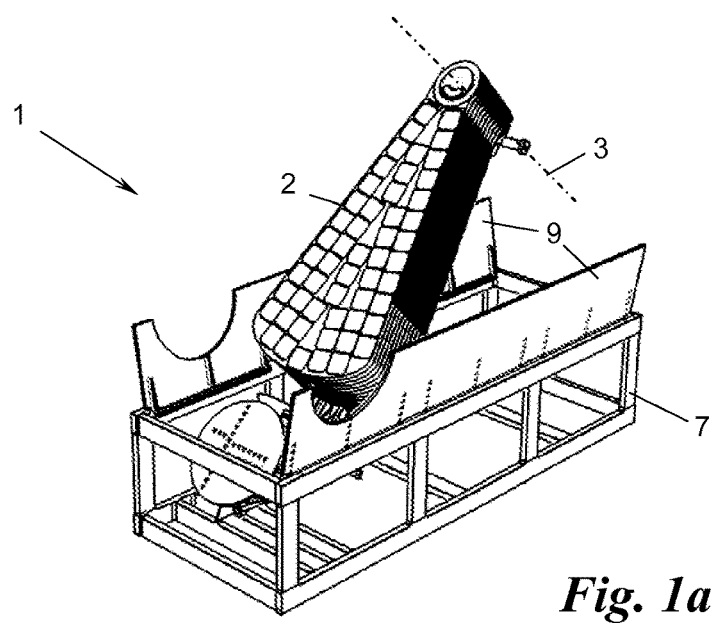
FIGS. 1a and 1b show the solar module of the invention in two different operating positions, each in a perspective view.
Figure 1B:
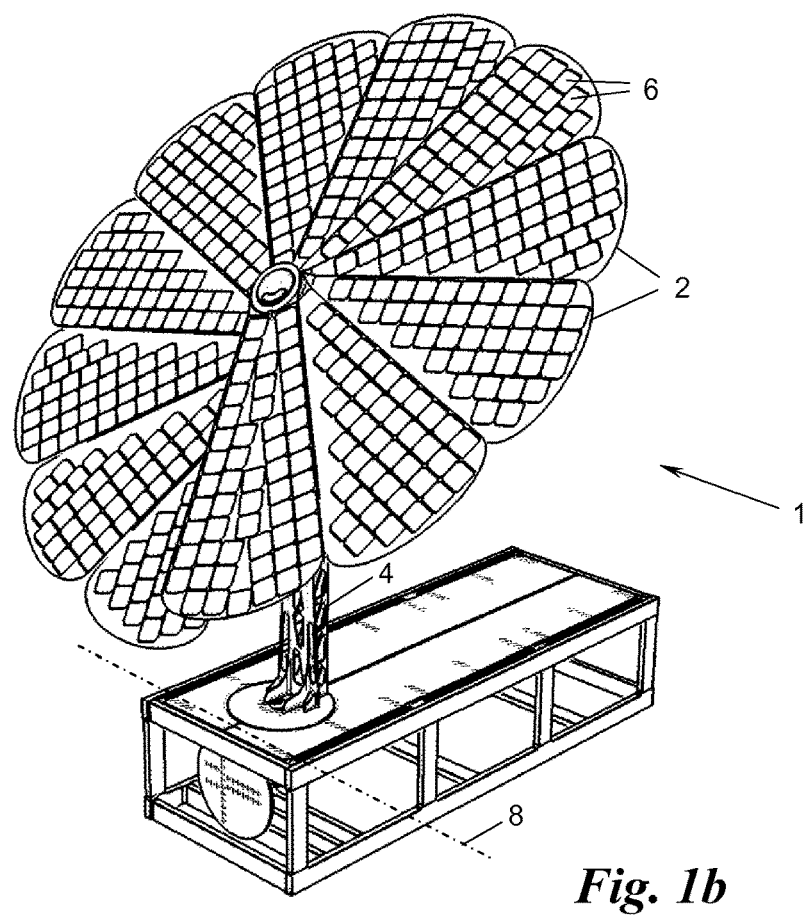

According to FIGS. 1a and 1b, a solar module 1 comprises a plurality of lamellar solar panels 2, which are mounted pivotingly about a common axis 3 on a support 4, more precisely on a swivel head 5 (FIG. 2) of the same. The solar panels 2 have approximately the form of a sector of a circle, preferably with slightly rounded edges ("petal form"), as depicted.

Each solar panel 2 comprises, on its upper side, a planar array of photovoltaic cells 6, e.g., in crystalline or organic form or in thin film technology. The electric connections and wirings of the solar panels 2 and solar cells 6 are not depicted for simplicity; for example, the solar panels 2 are connected to the support 4 or swivel head 5, respectively, via flexible connection cables or sliding contacts and rigid contact rings and are connected to further energy transmission electrics.

Due to their pivot mounting about the rotation axis 3, the solar panels 2 can be moved from a first, slid-together ("fanned-in") position, shown in FIG. 1a, in which they are positioned one over the other in a substantially congruent manner, to a second, fanned-out position, shown in FIG. 1b, in which they are fanned-out about the rotation axis 3 and thereby lie substantially next to each other, and vice-versa. The solar panels 2 preferably have such a circle-sector or petal form that they complement each other in the fanned-out position (FIG. 1b) approximately to a full circle. For example, twelve solar panels are provided, whose sector angle each is approximately 30°, wherein the pivoting angle of a solar panel 2 with respect to its neighbouring solar panel 2 is accordingly approximately 30°.

The support 4 together with the swivel head 5 can, for example, be mounted pivotingly in a housing 7 or other stand construction about a horizontal axis 8, such that it can, for example, be pivoted-in together with the fanned-in solar panels 2 into the housing 7, which can be closed with protective covers 9 to protect the solar panels 2 in the pivoted-in position from weather effects. The housing 7 can, for example, be embedded or integrated flushingly into the soil, the face of a building, the roof of a building, or the body of a car; however, the housing 7 can also be omitted. The support 4 can be, e.g., a vertical stand, which is solidly anchored to the underground and on which the solar panels 2 hang down vertically in the fanned-in state.

Figure 2:
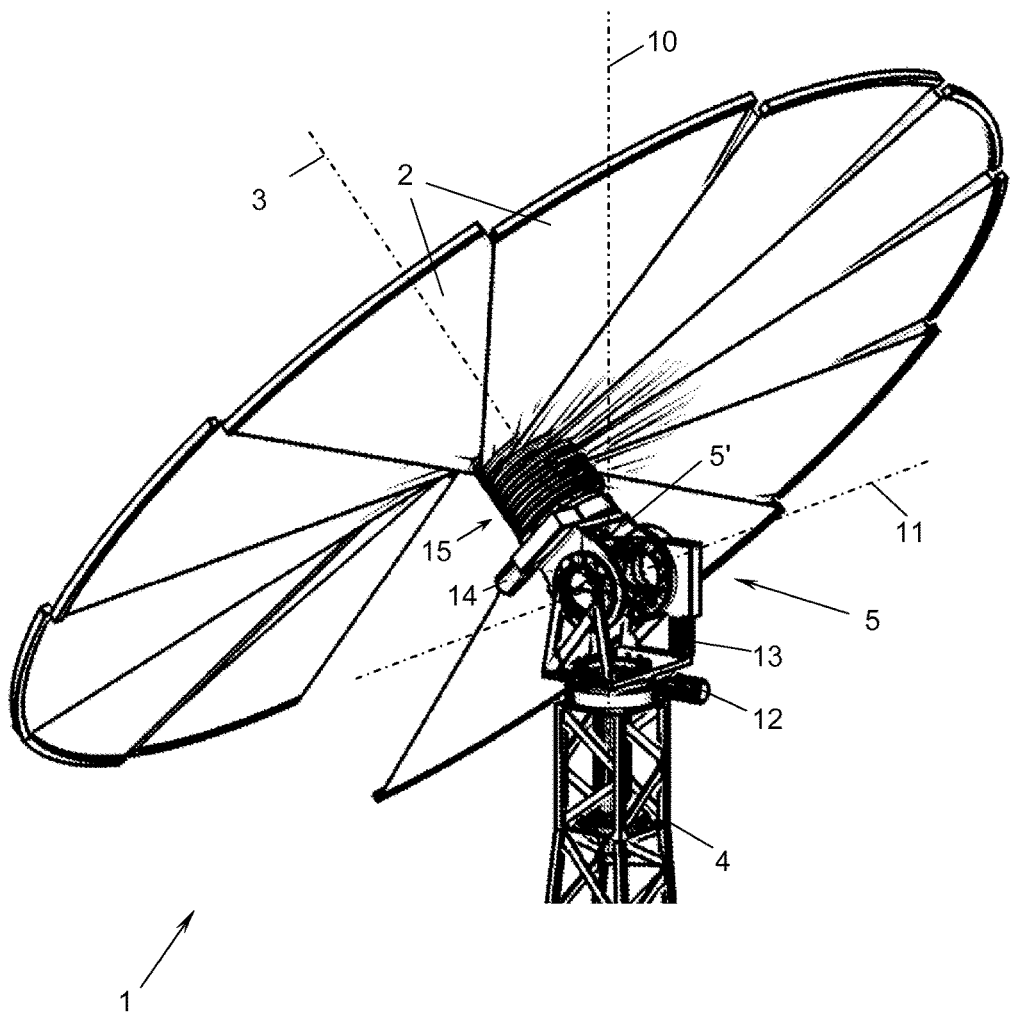
FIG. 2 shows a swivel head with a fanning-out mounting for solar panels in a perspective view.

As shown in FIG. 2, the swivel head 5 can confer further liberties of movement to the fanned-out solar panels 2 about a vertical rotation axis 10 and/or about a horizontal rotation axis 11, such that the rotation axis 3 or the solar panels 2, respectively, can be optimally aligned towards the sun. Electrical rotary drives 12, 13, 14 pivoting the swivel head 5 about the rotation axis 10 or 11, respectively, as well as for fanning-out the solar panels 2 about the rotation axis 3 can, for example, be embodied as described in AT 509 886 B1 as worm drives with sprockets and worms engaging therein, and in the same way a pivot drive for pivoting the support 4 with respect to the ground construction 7 about the axis 8. Stand construction or housing 7, support 4, and swivel head 5 thus form a support structure for the actual fanning-out mounting 15 of the solar panels 2, which is shown in FIGS. 3-8 in different embodiments in detail.

Figure 3:
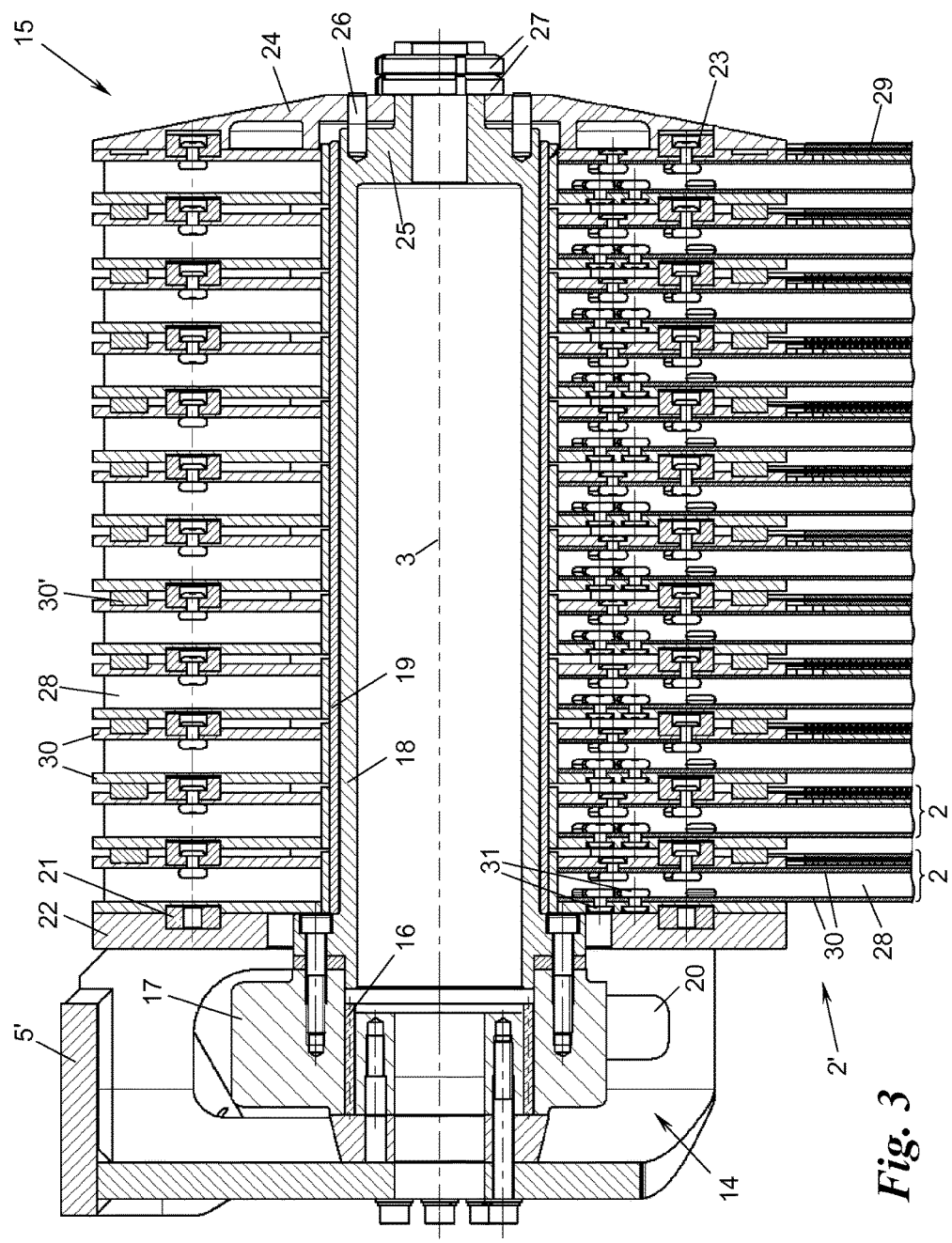
FIG. 3 shows a first embodiment of the fanning-out construction of the invention in a sectional view.

FIG. 3 shows a first embodiment of the fanning-out mounting 15 for pivotingly mounting the radially inner end sections 2', which lie on the side of the axis, of the solar panels 2 on an end piece 5' of the swivel head 5 in a sectional view. The head end piece 5' mounts a tubular axis 18 via a rolling bearing 16 and an anchoring ring 17, onto which axis 18 the end sections 2' of the solar panels 2—if applicable by interposing a sliding sleeve 19, e.g., made out of plastic such as, for example, PTFE—are threaded and mounted pivotingly. The end sections 2' simultaneously serve for a dragging drive of the solar panels 2 during fanning-out and fanning-in. For this purpose, the axis 18 is rotationally driven about the rotation axis 3 by the rotation drive 14. The rotation drive 14 can, for example, be realised by providing the bearing ring 17 with an outer toothed ring and driving it via a worm drive 20 (depicted only schematically). The axis 18 could, however, also be rotationally driven in another way known in the art.

The end section 2' of the first solar panel 2 (in FIG. 3 left), which is near the support structure 4, 5, 7, is connected to the support structure 4, 5, 7 in a rotation-fixed manner, for example, by bolts 21, which bolt the end section 2' to a face plate 22 of the head end piece 5'. The end section 2' of the last solar panel 2 (in FIG. 3 right), which is lying far from the support structure 4, 5, 7, is again connected in a rotation-fixed manner to a cover plate 24 via bolts 23, which cover plate 24 is in turn connected to the outer end 25 of the axis 18 via bolts 26 and nuts 27 in a rotation-fixed manner. During rotation of the axis 18, the outermost, right solar panel 2 is thereby rotationally driven by the cover plate 24, and each solar panel 2 drags the next solar panel 2 via a catch construction in the end sections 2', until the rotation-fixed innermost (left) solar panel 2 restricts the fanning-out or fanning-in movement and stops it.

The catch construction of FIG. 3 is now explained by means of the partially broken up perspective views of FIGS. 4a and 4b in more detail. As can be seen in FIG. 4a, in this embodiment each solar panel 2 comprises three radial support struts 28, which form the backbone for a photovoltaic panel 29 mounted thereon, which comprises the individual solar cells 6. The support struts 28 ("leaf veins") of the solar panels 2 ("petals") are, for example, extruded aluminium profiles with a rectangular cross section.

The ends of the support struts 28, which face the axis 18, are mounted in a sandwich-like manner between two approximately disk-shaped mounting plates 30, which are mounted on the axis 18, for example, via a plurality of screwed or riveted joints 31 or by welding. The force flow from the support struts 28 is thereby distributed symmetrically about the axis 18, as can be seen from FIG. 4a. The ends of the support struts 28, which are housed between the mounting plates 30, form together with the mounting plates 30 the end section 2' of the solar panel 2. The end section 2' thus comprises a central opening 32 for the passing-through of the axis 18, which opening can be provided with an additional strengthening ring 33, which slides on the axis 18 or the interposed sliding sleeve 19. Between the mounting plates 30 of two neighbouring end sections 2' sliding rings 30', e.g., made out of friction-reducing material such as, for example, PTFE, can be interposed.

As a catch construction between the end sections 2' of two neighbouring solar panels 2, each one mounting plate 30 (in FIGS. 4a and 4b the rearmost and in FIG. 3 the right one) is provided with catches in form of bolts 34, which are for example riveted into the mounting plate 30. In the shown example, there are provided six bolts 34, which a distributed around the circumference. The bolts 34 engage into oblong holes 35, which are provided in the respective other (in FIGS. 4a and 4b the frontmost and in FIG. 3 in the left) mounting plate 30 of the neighbouring end section 2'. Each oblong hole 35 extends in tangential or circumferential direction of the mounting plate 30 over the fanning-out angle of, e.g., approximately 30°, and its tangential ends 36, 37 form end stops for the bolts 34. During fanning-out of the solar panels 2 from the position shown in FIG. 4a to the position shown in FIG. 4b, each bolt 34 moves in an oblong hole 35 from its one end 36 to its other end 37 and vice versa.

Figure 5:
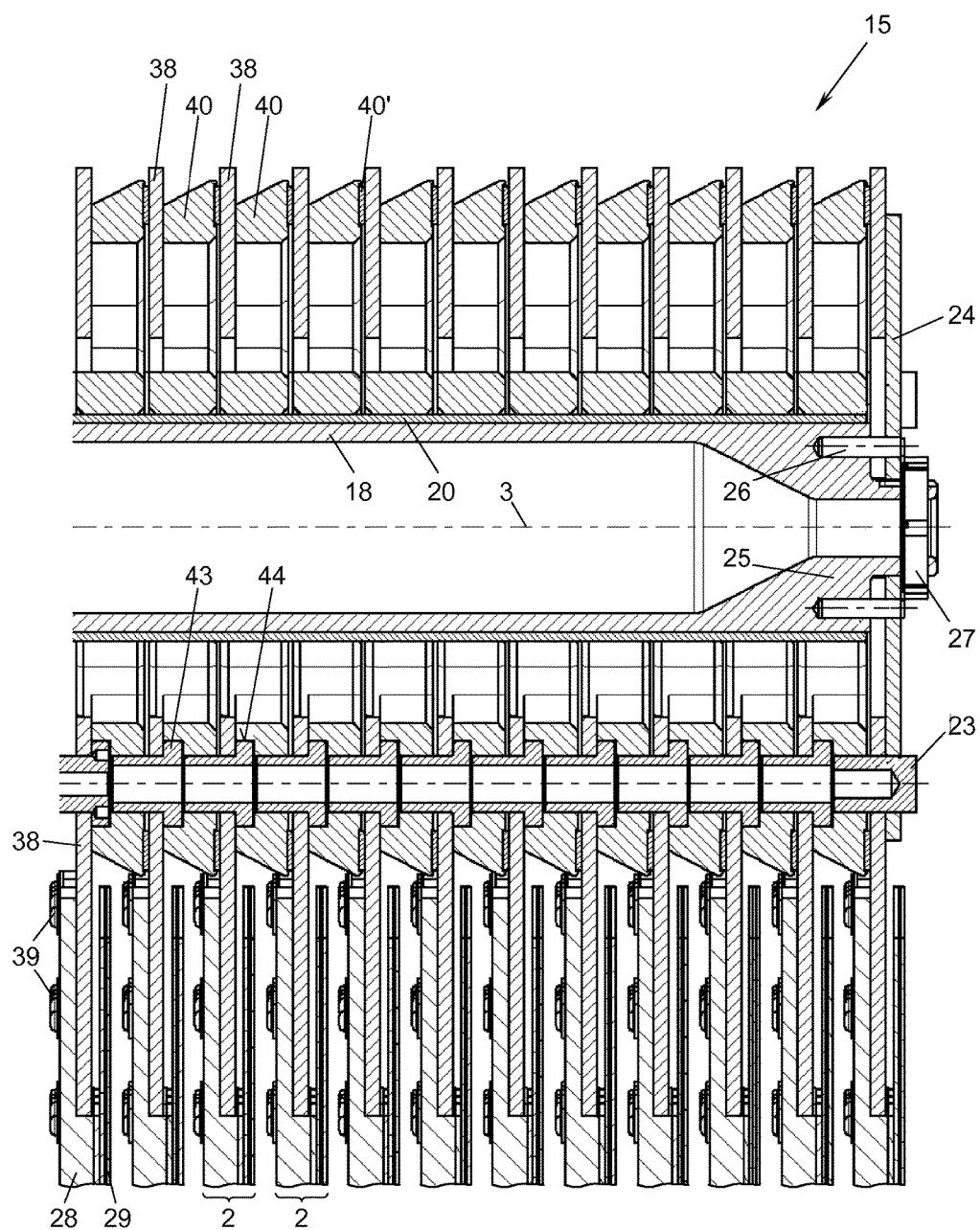
FIG. 5 shows a second embodiment of the fanning-out construction of the invention in a partial sectional view.
Figure 6:
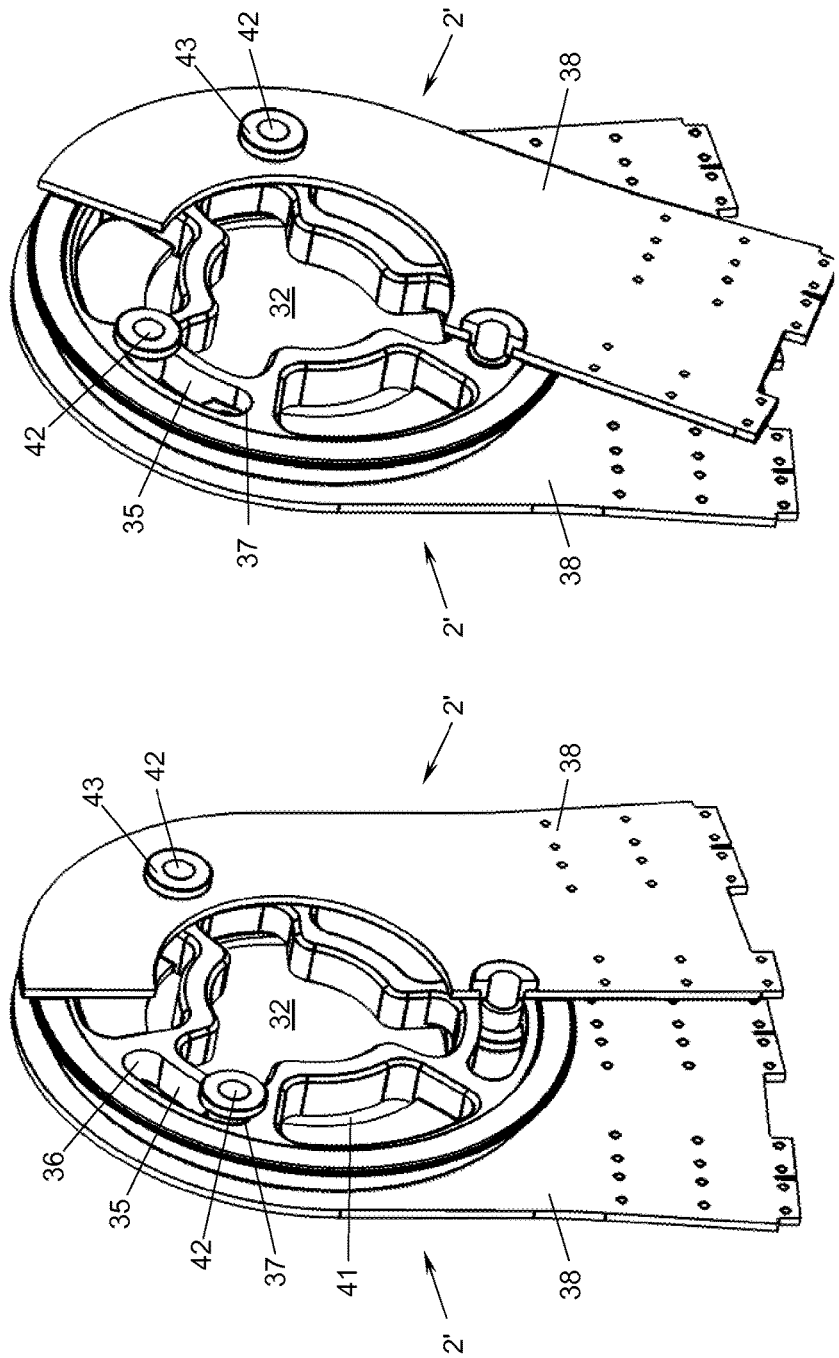
FIGS. 6a and 6b each show the end sections of two solar panels of the embodiment of FIG. 5, of which one is partially broken up, in perspective views in two different operating positions.

FIGS. 5, 6a, and 6b show a second embodiment of the solar panels 2, their end sections 2', and the fanning-out mounting 15. In this embodiment, each end section 2' has only one mounting plate 38, on which the support struts 28 are mounted on one side, for example, via screw joints 39. The mounting plates 38 are, for example, made out of 8 mm thick aluminium. Since the support struts 28 and the photovoltaic panels 29 carried by them have a higher thickness and the mounting plates 38 are thus to be mounted in an accordingly distanced manner on the axis 18, each mounting plate 38 is here provided with a spacer disk 40 lying against it on one side.

The spacer disk 40 is, for example, a plastic injection-moulded piece and contains—along further through-holes 41 for reducing material and weight—tangential oblong holes 35 analogue to the first embodiment of FIGS. 3 and 4. Again, bolts 42 engage into the oblong holes 35, which bolts 42 are anchored to the mounting plate 38 of the respective neighbouring end section 2'. The bolts 42 can move in the oblong holes 35 between their ends 36, 37, which act as limiting stops, to move the solar panels 2 from the fanned-in position (FIG. 6a) to the fanned-out position (FIG. 6b) and vice versa.

The bolts 42 thereby serve a double purpose: as depicted, each bolt 42 penetrates the mounting plate 38 and is widened on its one protruding end to a head 43, which rests in a recess 44 of the spacer disk 40 of its end section 2' to fix the spacer disk 40 to the mounting plate 38 in a rotation-fixed manner. The bolt 42 engages, with its other protruding end, into the tangential oblong hole 35 of the spacer disk 40 of the neighbouring end section 2'.

The spacer disks 40 can be provided with a slide coating or a separate sliding ring 40' on their surfaces which slide on a respective neighbouring mounting plate 38 or can generally be made out of friction-reducing material, like PTFE-plastic.

Figure 7:
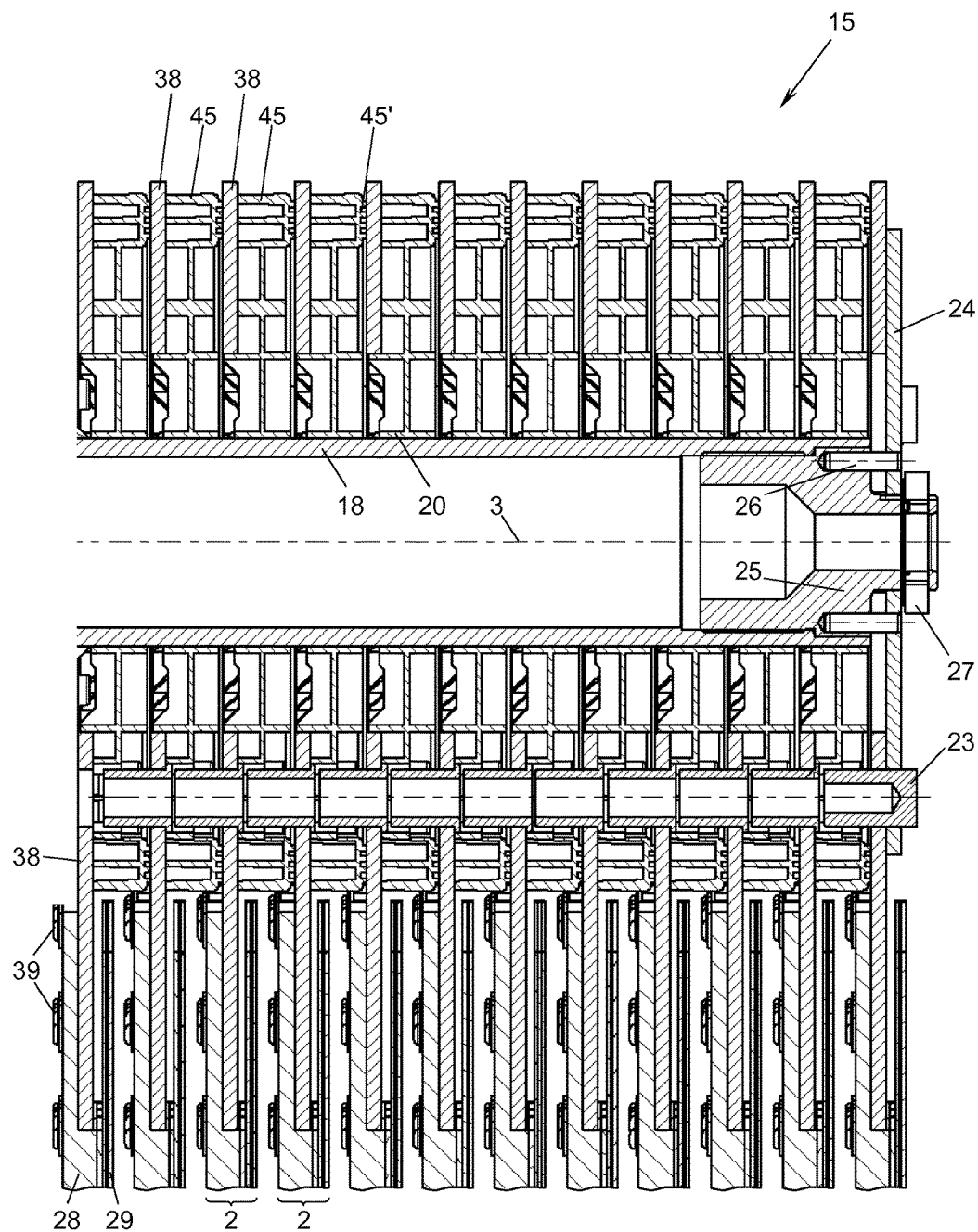
FIG. 7 shows a third embodiment of the fanning-out construction of the invention in a partial sectional view.

FIGS. 7 and 8 show a third embodiment of the solar panels 2, their end sections 2', and the fanning-out mounting 15. Each end section 2' here again comprises one single mounting plate 38, as in the embodiment of FIGS. 5 and 6, on which the support struts 28 for the photovoltaic module 29 are mounted via screwed or riveted joints 39. Between the mounting plates 38 of two neighbouring end sections 2', there is again provided a spacer disk 45. The spacer disks 45 are this time, however, not connected with each respective flange plate 38 in a rotation-fixed manner, but are embodied in form of loose sliding disks, which rest on the axis 18, wherein the sliding disks are provided on at least one side with a slide coating or a separate sliding ring 45' or are generally made out of friction-reducing material, like for example PTFE-plastic.

The spacer disks 45 have tangential oblong holes 46 or even bigger through holes, which now do not form limiting stops for catches themselves (as in the previous embodiment), but allow the unhindered penetration of separate stops 46 of a mounting plate 38, which interact with bolts 47 anchored in the neighbouring mounting plate 38. A bolt 47 of the mounting plate 38 of an end section 2' can thus move during fanning-out of the solar panels 2 between two stops 46 of the mounting plate 38 of a neighbouring end section 2', as shown in FIGS. 8a and 8b.

The spacer disks 45 can, for example, be embodied as delicate and light-weight plastic injection moulded pieces, which here only have to be structured so as to be pressure-proof in an axial direction, e.g., with a plurality of bridges.

The invention is not restricted to the specific embodiments described in detail herein but encompasses all variants and modifications thereof that fall within the framework of the appended claims.

What is claimed is:

1. A solar module, comprising:
   a plurality of solar panels, which are mounted pivotingly about a common axis on a support so as to be able to pivot between a first position, in which the plurality of solar panels are positioned one over the other in a substantially congruent manner, and a second position, in which the plurality of solar panels are fanned-out so as to substantially lie next to each other,
   wherein in the first and second positions the plurality of solar panels are parallel to each other and remain parallel to each other during fanning-out from the first position to the second position,
   wherein the plurality of solar panels includes at least one pair of neighbouring solar panels, each pair of neighbouring solar panels having a first solar panel and a second solar panel, the first solar panel of the pair including a first mounting plate supported to pivot about the common axis and having a catch that protrudes from the first mounting plate in a direction along the common axis toward the second solar panel of the pair, the second solar panel of the pair including a second mounting plate supported to pivot about the common axis and having two stops that protrude from the second mounting plate in a direction along the common axis and toward the first mounting plate, wherein the catch and two stops are arranged such that the catch can move between the two stops when the first and second solar panels of the pair move relative to each other during said fanning-out, and such that engagement of the catch with the two stops limits pivotal movement of the first and second solar panels of the pair relative to each other about the common axis.

2. The solar module according to claim 1, wherein the first and second mounting plates each have an approximately disk-like portion and the first mounting plate has the catch and at least one additional catch for a total of at least two catches and the second mounting plate has the two stops and at least two additional stops for each additional catch of the first mounting plate.

3. The solar module according to claim 1, wherein each of the plurality of solar panels includes a support strut that supports solar cells of the associated solar panel, the support strut having an end that is mounted to the mounting plate of the associated solar panel.

4. The solar module according to claim 1, wherein the catch is a bolt riveted to the first mounting plate, and the two stops each include a bolt anchored in the second mounting plate.

5. The solar module according to claim 1, wherein the mounting plate of each of the plurality of solar panels includes an opening through which the common axis passes, the solar module further comprising a sliding disk between the first and second mounting plates of each at least one pair of neighbouring solar panels.

6. The solar module according to claim 1, wherein the second mounting plate includes a catch that protrudes away from the second mounting plate in a direction along the common axis away from the first mounting plate, and the first mounting plate includes two stops that protrude away from the first mounting plate in a direction along the common axis away from the second mounting plate.

7. A solar module, comprising:
   a plurality of solar panels, which are mounted pivotingly about a common axis on a support so as to be able to pivot between a first position, in which the plurality of solar panels are positioned one over the other in a substantially congruent manner, and a second position, in which the plurality of solar panels are fanned-out so as to substantially lie next to each other,
   wherein in the first and second positions the plurality of solar panels are parallel to each other and remain parallel to each other during fanning-out from the first position to the second position,
   wherein each of the plurality of solar panels includes a mounting plate having a catch protruding from a first side of the mounting plate and two spaced apart structural stops protruding from a second side of the mounting plate opposite the first side of the mounting plate, and
   wherein the plurality of solar panels includes at least one pair of neighbouring solar panels, each of the at least one pair of neighbouring solar panels including a first solar panel and a second solar panel, the mounting plate of the first solar panel of the pair being a first mounting plate having a catch protruding from the first mounting plate and the mounting plate of the second solar panel of the pair being a second mounting plate having two spaced apart structural stops protruding from the second mounting plate which interact with the catch of the first mounting plate such that the catch of the first mounting plate is caught between the two spaced apart structural stops of the second mounting plate when the first and second solar panels of the pair move relative to each other during said fanning-out, and such that engagement of the catch of the first mounting plate with the two spaced apart structural stops of the second mounting plate limits pivotal movement of the first and second solar panels of the pair relative to each other about the common axis.

8. The solar module according to claim 7, wherein the catch of the first mounting plate protrudes from the first mounting plate at a location between the two stops of the second mounting plate.

9. The solar module according to claim 1, wherein twelve solar panels are provided.

10. The solar module according to claim 1, wherein one of the first or second mounting plates of a pair of neighbouring solar panels is fixed relative to the support.

11. The solar module according to claim 10, further comprising a top plate, which is connected to one of the plurality of solar panels, the top plate being motor driven to pivot about the common axis and to pivot at least some of the plurality of solar panels about the common axis.

12. The solar module according to claim 1, wherein the plurality of solar panels are driven from the first position to the second position via a worm gear by an electric motor.

13. The solar module according to claim 1, wherein the first and second mounting plates are mounted via a common sliding sleeve on the support.

14. The solar module according to claim 7, further comprising a sliding disk arranged between the first and second mounting plates of each pair of neighbouring solar panels.

15. The solar module according to claim 1, wherein the support comprises a swivel head on which the plurality of solar panels are mounted.

16. The solar module according to claim 7, wherein one of the first or second mounting plates of a pair of neighbouring solar panels is fixed relative to the support.

17. The solar module according to claim 16, further comprising a top plate, which is connected to one of the plurality of solar panels, the top plate being motor driven to pivot about the common axis and to pivot at least some of the plurality of solar panels about the common axis.

18. The solar module according to claim 7, wherein the first and second mounting plates are mounted via a common sliding sleeve on the support.

19. The solar module according to claim 7, wherein the support comprises a swivel head on which the plurality of solar panels are mounted.

20. The solar module according to claim 7, wherein each of the plurality of solar panels includes a support strut that supports solar cells of the associated solar panel, the support strut having an end that is mounted to the mounting plate of the associated solar panel.

* * * * *